March 4, 1941.  S. G. LIPSETT  2,233,952

WINDOW FRAME CONSTRUCTION

Filed Aug. 29, 1938  3 Sheets-Sheet 1

INVENTOR
S. G. LIPSETT
BY J. D. O'Connell
ATTORNEY

March 4, 1941.    S. G. LIPSETT    2,233,952
WINDOW FRAME CONSTRUCTION
Filed Aug. 29, 1938    3 Sheets-Sheet 2

INVENTOR
S. G. LIPSETT
BY J. D. O'Connell
ATTORNEY

March 4, 1941.    S. G. LIPSETT    2,233,952
WINDOW FRAME CONSTRUCTION
Filed Aug. 29, 1938    3 Sheets-Sheet 3

INVENTOR
S. G. LIPSETT
BY J. D. O'Connell
ATTORNEY

Patented Mar. 4, 1941

2,233,952

UNITED STATES PATENT OFFICE 2,233,952

WINDOW FRAME CONSTRUCTION

Solomon G. Lipsett, Montreal, Quebec, Canada, assignor to The Robert Mitchell Co. Limited, Montreal, Quebec, Canada Application August 29, 1938, Serial No. 227,405

9 Claims. (Cl. 20—56.5)

This invention relates to insulating windows equipped with glazing comprising opposed panes of glass separated by intervening insulating cells. Such windows fall into two main classes. The first is the hermetically-sealed evacuated or dehydrated type in which the cell space between adjacent glasses is completely closed off. The second is the vented type in which the cell space between adjacent glasses is vented to the atmosphere. The present invention provides improvements applicable to both types of windows.

An important feature of the invention resides in the provision of a vented insulating window in which the cell space between adjacent glasses is hermetically sealed except for a single small vent leading to the outdoor atmosphere. The single vent affords a pressure equalizing breather opening through which air is drawn into and expelled from the cell space so that the pressure in said space is automatically equalized with the prevailing outdoor atmosphere pressure under all climatic conditions. The equalization of the cell pressure with the exterior pressure substantially eliminates the excessive pressure flexing of the glasses which, in windows of the hermetically sealed type, frequently results in overstressing and failure of the sealing means provided between the marginal portions of the cell forming glasses. This is an important aid to the commercial production of satisfactory insulating windows in which the marginal portions of the cell forming glasses are adhesively united by means of an interposed plastic sealing composition.

Another advantage of the breather vent is that it enables the cell space between the glasses to be quickly cleared of moisture during the winter months. This follows from the fact that the vapor pressure is always greater on the warm side of a window than on the cold side so that there will be a tendency for moisture to migrate toward the colder side. Consequently, under winter conditions, any moisture present between the cell forming glasses tends to diffuse through the breather vent to the outdoor temosphere so that there is no objectionable frosting and fogging due to the accumulation of moisture. The chief benefit realized here is the rapid elimination of small amounts of moisture entering the cell space through minute leaks developing in the sealing means provided between the marginal portions of the glasses.

Contrary to what might be expected from generally accepted theories dealing with moisture condensation on cold surfaces, I have found that a double glazed insulating window provided with a single small vent leading to the outdoor atmosphere will operate satisfactorily under both winter and summer conditions and may be used throughout the entire year in air conditioned railway cars and other air conditioned enclosures. This has been conclusively demonstrated by laboratory tests and actual commercial use under the severest summer conditions of temperature and humidity encountered throughout the greater part of Canada and the United States.

In the summer season there are a few periods of high humidity during which the temperature of the glass exposed to the indoor or air conditioned atmosphere is below the dew point of the outdoor atmosphere air. Failure of condensation to occur under these conditions is due to the shortness of the high humidity periods and to the slowness of the breathing action which takes place through the single outdoor vent. The high humidity periods usually last only a few hours and are over before the air between the glasses is replaced by a sufficient quantity of the warm moist outdoor air to cause condensation or misting of the glasses.

A further advantage of the vented insulating window provided in accordance with this invention is that the single outdoor vent enables the desired pressure equalization to be realized without promoting actual circulation of outside air through the cell space between the glasses. Such circulation is undesirable since it increases the hazard due to dust infiltration; lowers the resistance of the window to heat transmission; and tends to permit a too-rapid filling of the cell space by the warm moist outdoor air during those high humidity periods when the temperature of the indoor glass is below the dew point of the outdoor atmosphere air.

A further feature of the invention resides in the provision of an insulating window equipped with a preformed glazing unit comprising two spaced panes of glass having their marginal portions cemented together by an interposed plastic sealing composition, the cell space between the panes being vented to the outdoor atmosphere through a single vent tube which passes through and is held in place by the sealing composition, said tube being formed so that its outer portion extends outwardly over an adjacent edge portion of the outdoor pane.

A still further feature of the invention resides in the provision of improved means for preventing the entrance of dust and water through the vent tube when the window is in use.

The production of a satisfactory multi-pane glazing unit in which the marginal portions of the panes are cemented together by an interposed sealing composition requires the use of an adhesive composition which is capable of being extruded into place between the marginal portions of the glass panes and possesses certain other essential properties including the property of permanently maintaining a relatively soft and plastic non-flowing condition and sufficient resiliency to prevent rupture of the bond by the expansion, contraction and flexure of the panes which takes place under varying atmospheric conditions. I have found that sealing compositions possessing these requisite properties are apt to be seriously impaired by the deleterious action of oils and solvents contained in the putty and other caulking compounds usually employed for securing the glazing unit in position within a wooden or metal frame. Accordingly, a further feature of the present invention resides in the provision of an oil and solvent resistant protective covering for the sealing compound uniting the component panes of the glazing unit. To this end thin and highly flexible sheets of metal foil, preferably aluminum foil, are folded about the marginal portions of the glazing unit and cemented in place in intimate contact with the engaging outer surfaces of the glass panes and the exposed surface of the interposed sealing composition, the cementing agent employed for securing the protective foil in place being one that is resistant to the oils and solvents contained in the caulking compounds but has no deleterious effect on the sealing compound of the glazing unit. This feature of the invention is applicable to glazing units of the hermetically sealed type as well as to glazing units of the vented type.

The present application is a continuation, in part, of my prior application Serial No. 149,349 filed June 21, 1937.

In the further description of the invention disclosed in the instant application reference will be had to the accompanying drawings, wherein—

Figure 1:
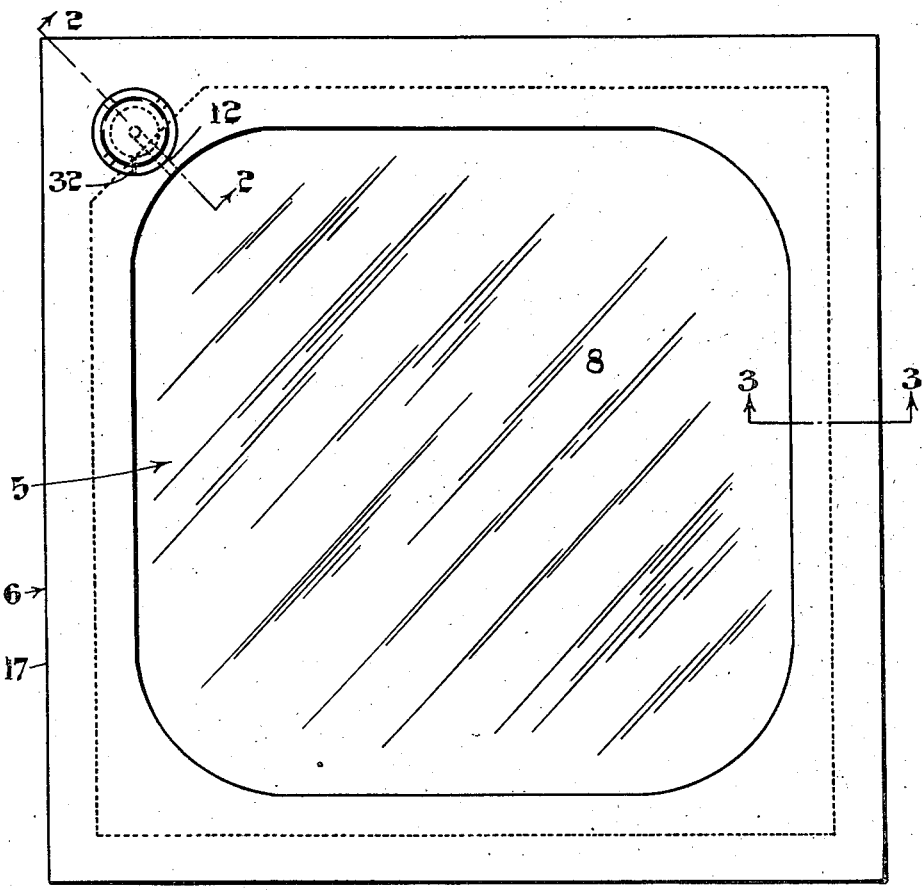
Fig. 1 is an outside elevational view of a vented insulating window constructed in accordance with a preferred embodiment of my invention.

In Figures 1 to 6 inclusive, 5 designates a preformed multi-pane glazing unit mounted in a suitable sash frame 6.

Unit 5 comprises transparent indoor and outdoor panes 7 and 8 spaced apart by sealing means 9 interposed between their marginal edges. The sealing means is shown as a continuous marginal strip of plastic composition in which suitable spacers 10 are embedded to prevent collapse of the unit by external pressure. The composition 9 is preferably one that does not harden to brittleness but retains a relatively soft, tacky and non-flowing condition and possesses considerable resiliency. The use of a sealing composition having these properties is an important factor in preventing rupture of the seal by the stresses due to expansion, contraction and flexure of the panes 7 and 8 under varying atmospheric conditions. An assisting factor in preventing rupture of the seal is the venting of the cell space 11 through the vent tube 12. The resulting pressure equalizing effect materially decreases the stresses to which the plastic sealing composition is subjected in service.

I have found that a plastic composition, suitable for joining the edges of the panes 7 and 8, may be obtained by adding suitable plasticizing agents to certain synthetic resins manufactured by Shawinigan Chemicals Limited, of Shawinigan Falls, Quebec. The resins in question are sold under the trade names "Formvar 7–90" and "Formvar 15–95." In one instance the synthetic resin sold under the trade name "Formvar 7–90" was plasticized by the addition of 50% of diacetin and gave an adhesive plastic characterized by a melting point of not over 180° C. and by the property of remaining flexible at temperatures as low as −20° F. A product having similar properties was obtained when the synthetic resin sold under the trade name "Formvar 15–95" was plasticized by the addition of 50% of dibutyl phthalate. Panes 7 and 8 may also be joined together in a satisfactory manner by use of compositions of the class disclosed in U. S. Patents 2,070,331, dated Feb. 9, 1937 and Reissue 20,430, dated June 29, 1937.

The composition sealing strip 9 and spacers 10 are preferably applied in accordance with the invention disclosed in the co-pending application of Harold M. Woelfel, filed May 13, 1938, under Ser. No. 207,719. The composition 9 should therefore be one capable of being extruded into place between the marginal edges of the panes 7 and 8. The spacers 10 are preferably composed of resilient blocks of rubber which are pressed into and completely covered by the composition 9 after the latter has been laid in place.

Tube 12 is shown as a right angle tube through which the cell space 11 is vented to the atmosphere at the outdoor side of the window. The arm 13 of this tube is passed into space 11 through an opening provided in the sealing compound 9. The compound is packed tightly about the arm 13 and serves to hold the tube in position. The remaining tube arm 14 is directed outwardly over the adjacent edge of the outdoor pane 8 to a point well beyond the outer surface of said pane.

Frame 6 is made in accordance with the invention disclosed in U. S. Patent 2,128,870, granted August 30, 1938. It comprises inner and outer frame sections 16 and 17 substantially L-shaped in cross section. These sections are fitted together so that their flanges 18 form the side walls of a channel in which the marginal portions of the glazing unit 5 is sealed by the caulking compound 19. The bottom of the glazing receiving channel is formed by flanges 20 disposed in overlapping relation and held out of direct contact with each other by an interposed layer 21 of fibrous or other suitable insulating material of low thermal conductivity. Flanges 20 are secured together by screws 22 passing through the interposed insulating material 21.

Unit 5 is fitted in frame 6 so that arm 14 of the vent tube projects outwardly through opening 23 provided in the outdoor side of the frame. A nipple 24 is fitted on arm 14 in screw threaded engagement with the wall of opening 23. An internally and externally threaded filter casing 25 is then screwed onto nipple 23 until its inner end bears tightly against a previously positioned washer 26 surrounding said nipple. Filter casing 25 contains a suitable filtering medium 27 and has an opening 28 formed in its outer end in line with the outer end of the tube arm 14. Nipple 24 may be considered a removable part of casing 25.

Figure 2:
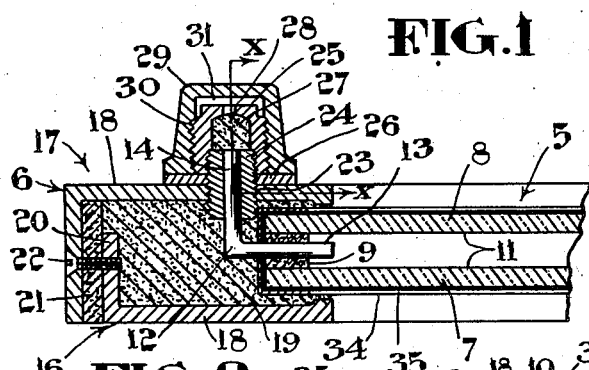
Fig. 2 is a sectional view along the line 2—2 of Fig. 1.
Figure 2A:
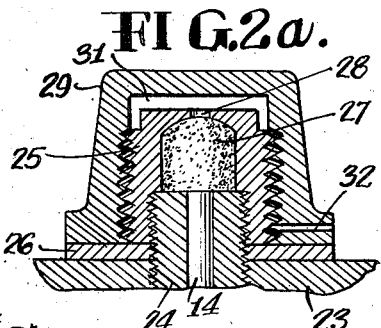
Fig. 2a is a sectional view along the line X—X of Fig. 2.
Figure 3:
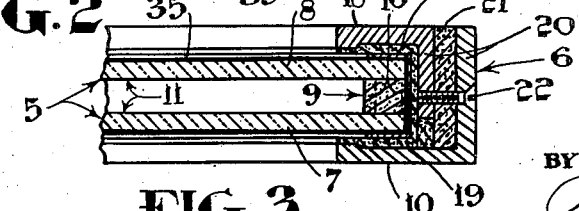
Fig. 3 is a sectional view along the line 3—3 of Fig. 1.
Figure 4:
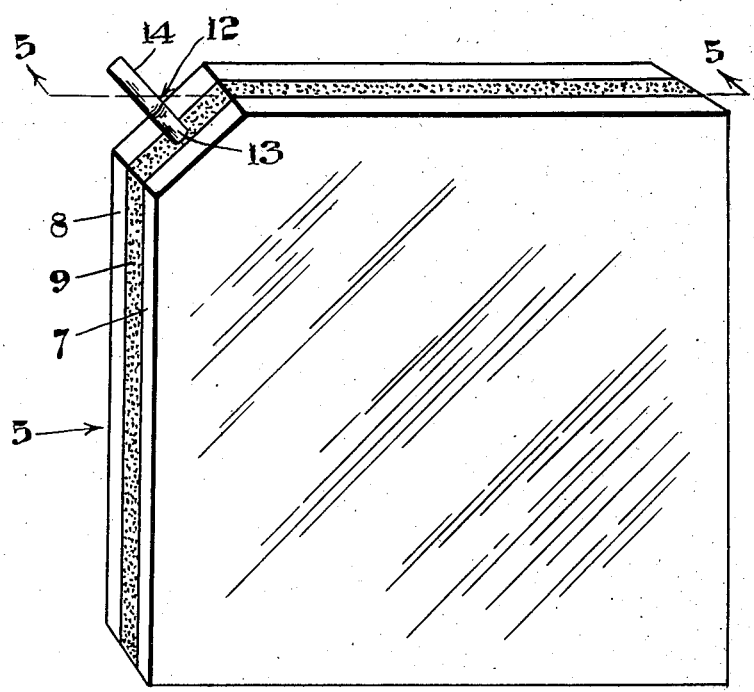
Fig. 4 is a perspective view of a preformed multi-pane glazing unit which constitutes an element of the complete assembly shown in the preceding figures. This figure shows the glazing unit per se as it appears in the absence of the metal foil used to protect the sealing composition between the glass panes.
Figure 5:
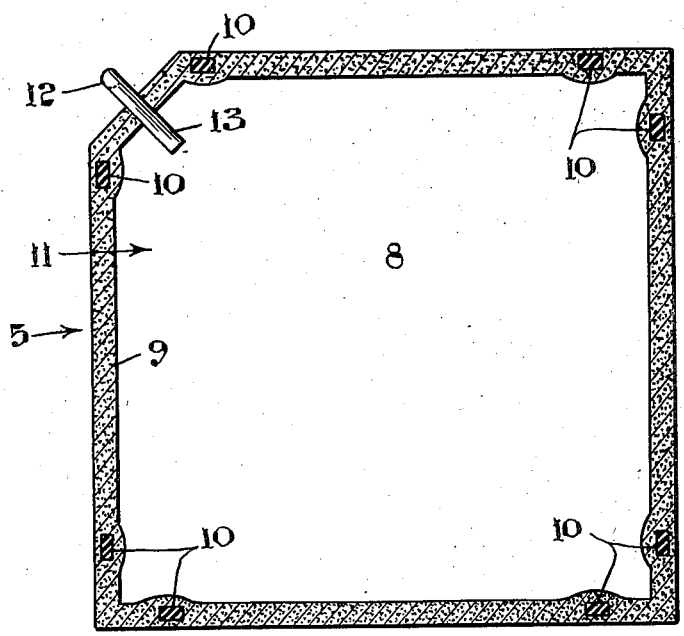
Fig. 5 is a sectional view along the line 5—5 of Fig. 4.
Figure 6:
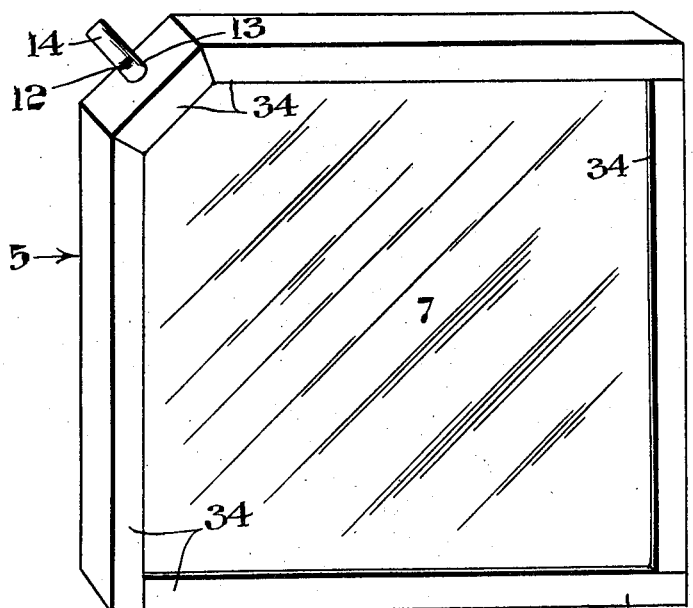
Fig. 6 is a view similar to Fig. 4 but showing the protective foil applied to the preformed glazing unit.

A hollow moisture excluding cap 29 is then screwed onto casing 25 so that the inner end of the cap also bears against the washer 26. As shown at 30, the skirt portion of cap 29 is internally threaded to fit the externally threaded portion of casing 25. The cap is designed so that, when its inner end is screwed tightly against the washer 26, an air space 31 is left between the outer end of casing 25 and the overlying wall of the cap. The interior of the cap is vented to the atmosphere through a small port 32 which pierces the threaded skirt of the cap at a point remote from the air space 31. In the present instance opening 32 (see Figs. 1 and 2a) is shown located close to the inner end of the cap so that it extends in a vertical direction. Opening 32 is connected to air space 31 by a restricted moisture-baffling passage formed by and between the interengaging threads of cap 29 and casing 25.

From the foregoing it will be seen that cell space 11 is vented to the atmosphere in such manner as to guard against the entrance of dust and moisture through the vent tube 12.

As previously stated, thin strips of metal foil are applied to the marginal portions of unit 5 to prevent impairment of the sealing compound 9 by the deleterious action of oils and solvents contained in the caulking compound 19. These strips are indicated at 34 in Figs. 2, 3, 6, 7 and 8. They should be exceedingly thin and pliable so that they may be readily bent over the marginal portions of the glazing unit and pressed into intimate contact with engaging portions of the glass panes 7 and 8 and the interposed sealing composition 9. In practice I have obtained the best results by using strips of aluminum foil .0016" in thickness. Such strips have sufficient mechanical strength; may be quickly and conveniently pressed into place; and do not tend to gap or move away from the glass panes to which they are cemented. Prior to application these strips are coated on one side with a thin film of a suitable adhesive agent shown at 35 in Figs. 2, 3 and 8. This agent should be one that is resistant to oils and solvents used in the ordinary caulking compounds and has itself no deleterious effect on the sealing compound 9. Its composition should be such that it remains permanently flexible and tacky and has little tendency to become brittle at low temperatures. Its composition should also be such that its adhesiveness is as good immediately after the metal foil has been applied as it is later on. I have found that these requirements are adequately met by applying to the foil strips a thin film of an adhesive substance known commercially under the trade name of "Vistanex No. 6." This substance appears to be a synthetic material made by the polymerization of isobutene. It is described by the manufacturers as a polymerized hydrocarbon of straight chain structure. I do not, however, limit myself to the use of this material as any other adhesive agent possessing the requisite properties may be used for the purpose in question.

Figure 7:
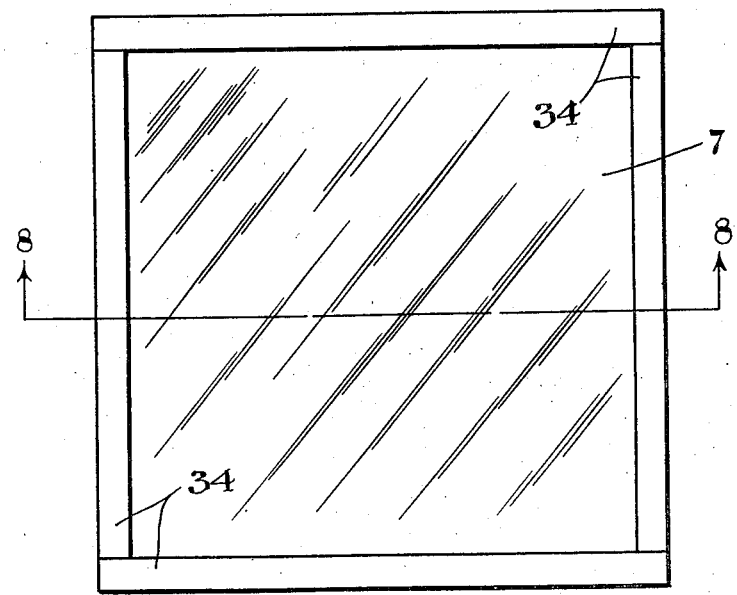
Fig. 7 is an elevational view showing the protective foil applied to a preformed multi-pane glazing unit of the hermetically sealed type.
Figure 8:
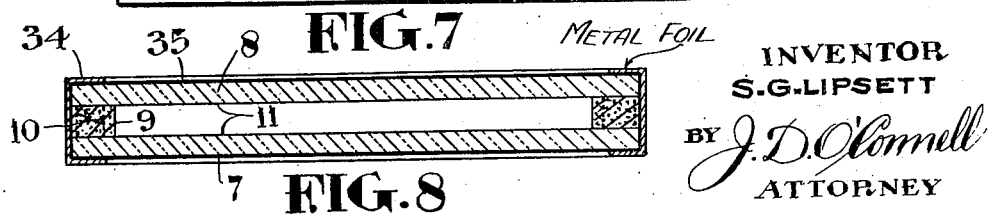
Fig. 8 is a sectional view along the line 8—8 of Fig. 7.

In Figs. 7 and 8 I have shown the foil strips 34 applied to the marginal portions of a ventilating window of the hermetically sealed type in which the cell space 11 is completely closed off by the glass panes 7 and 8 and the interposed sealing compound 9.

While I have described only certain preferred embodiments of the improvements provided by this invention it will be understood that various modifications may be resorted to within the scope and spirit of the appended claims. It is also pointed out that the improved vent connection described herein may be used in place of the vent connections previously proposed for double glazed insulating windows that are vented to the outdoor atmosphere in winter and to the indoor atmosphere in summer. In such windows the indoor and outdoor vents are used selectively dependent on the season of the year, the indoor vent being plugged or otherwise closed off during the winter time and the outdoor vent being similarly plugged or closed off in the summer time. While I have found that this selective venting of the air space between the glazing is unnecessary, it is nevertheless obvious that, where such a construction is demanded, it may easily be supplied in accordance with this invention by the simple addition of an indoor vent constructed and applied in the same manner as the outdoor vent. In such a case plugs, valves or other suitable means may be provided for closing off the vent which is to be put out of service during a given season.

Having thus described my invention, what I claim is:

1. An insulating window provided with a glazing assembly comprising two spaced transparent panes having their marginal portions cemented together by an interposed plastic composition characterized by a substantial degree of resiliency and preformed rubber spacers embedded in said composition at suitably spaced intervals to prevent collapse of the unit by external pressure, the cell space between the panes being hermetically sealed except for a single small vent leading to the outdoor atmosphere.

2. An insulating window provided with a glazing assembly comprising two spaced transparent panes having their marginal portions cemented together by an interposed plastic composition in which resilient rubber spacers are embedded at suitable intervals to prevent collapse of the unit by external pressure, said plastic composition being characterized by substantial resiliency and the ability to retain a relatively soft and tacky condition, the cell space between the glasses being hermetically sealed except for a single small vent leading to the outdoor atmosphere.

3. An insulating window comprising a frame, a glazing unit having its marginal portions sealed in said frame by a caulking compound, said unit comprising two spaced transparent panes having their marginal portions cemented together by an interposed plastic composition to form an enclosed cell space hermetically sealed except for a single small vent connection to the outdoor atmosphere, and a protective oil and solvent resistant covering applied to the marginal portions of the unit to prevent impairment of the sealing composition by the oils and solvents contained in the caulking compound, said covering comprising thin strips of metal foil folded about the marginal portions of the unit, said strips being cemented directly to the engaging surfaces of the glass panes and to the portion of the sealing compound which is exposed between said panes.

4. An insulating window including a frame provided with a glazing assembly comprising two transparent panes having their marginal portions cemented together by an interposed plastic composition in which resilient rubber spacers are embedded at suitable intervals to prevent collapse of the unit by external pressure, said plastic composition being characterized by substantial resiliency and the ability to retain a relatively soft and tacky condition, the cell space between the glasses being hermetically sealed except for a single vent connection leading to the outdoor atmosphere, said vent connection comprising a bent tube including an inner portion lying between the panes and extending into the cell space through an opening in the sealing composition and an outer portion extending outwardly over an adjacent edge of the outdoor pane and through an opening in the outdoor side of the frame, and a removable dust and moisture excluding device detachably secured to said frame over the said outer portion of the tube.

5. An insulating window as set forth in claim 4 in which said device includes a nipple detachably secured in said opening and surrounding the outer portion of said tube and a hollow filter holding casing fitted to the nipple so that the outer end of the tube opens into said casing, said casing containing filtering material covering the outer end of the tube and being vented to the atmosphere.

6. An insulating window comprising a frame, two transparent panes spaced apart by sealing means interposed between their marginal edges, a tube through which the cell space between the glasses is vented to the atmosphere, and a removable dust and moisture excluding device fitted in the outer end of the tube and detachably secured to said frame, said device comprising a nipple detachably secured in said opening and surrounding the outer portion of the tube, a filter casing fitted to the nipple so that the outer end of the tube is open to the interior of said casing, filtering material contained in said casing and covering the outer end of said tube, and a hollow moisture excluding cap fitted over the filter casing, said filter casing being vented to an air space within the cap and the latter being vented to the atmosphere through an opening remote from said air space but connected therewith through an intervening passage provided between opposing walls of the cap and casing.

7. An insulating window comprising a frame, two transparent panes spaced apart by sealing means interposed between their marginal edges, a tube through which the cell space between the glasses is vented to the atmosphere, and a removable dust and moisture excluding device fitted in the outer end of the tube and detachably secured to said frame, said device comprising a nipple detachably secured in said opening and surrounding the outer portion of the tube, a filter casing fitted to the nipple so that the outer end of the tube opens into the interior of said casing, filtering material contained in said casing and covering the outer end of the tube, a hollow moisture excluding cap fitted over the casing in screw threaded engagement therewith, said casing being vented to an air space reserved between the outer end of the casing and the opposing wall of said cap and the latter being vented to atmosphere through an opening piercing its threaded wall at a point remote from the air space, said opening and air space being connected by a tortuous air passage.

8. An insulating window comprising a frame, two transparent panes spaced apart by sealing means interposed between their marginal edges, a tube through which the cell space between the glasses is vented to the atmosphere, and a removable dust and moisture excluding device fitted in the outer end of the tube and detachably secured to said frame, said device comprising a filter casing detachably fastened to the frame so that the outer end of the tube opens into the interior of the casing, filtering material contained in said casing and covering the adjacent end of the tube, and a hollow moisture excluding cap fitted over the filter casing and detachably secured in place, said casing being vented to an air space within the cap and the latter being vented to atmosphere through an opening remote from said air space but connected therewith through an intervening air passage.

9. An insulating window comprising a frame, two transparent panes spaced apart by sealing means interposed between their marginal edges, a tube through which the cell space between the glasses is vented to the atmosphere, and a removable dust and moisture excluding device fitted in the outer end of the tube and detachably secured to said frame, said device comprising a filter casing detachably fastened to the frame so that the outer end of the tube opens into the interior of said casing, filtering material contained in said casing and covering the adjacent end of the tube, and a hollow moisture excluding cap having its skirt portion fitted over the casing in screw threaded engagement therewith, said casing being vented to an air space reserved between the outer end of the casing and the opposing wall of the cap and the latter being vented to atmosphere through an opening in its skirt portion, said opening being remote from said air space but in communication therewith through an intervening air passage formed by and between the interengaging threads of the cap and casing.

SOLOMON G. LIPSETT.